US012533446B2

United States Patent
Conrad et al.

(10) Patent No.: US 12,533,446 B2
(45) Date of Patent: Jan. 27, 2026

(54) PROCESS FOR MANUFACTURING AN INJECTION AGENT AND INJECTION AGENT OBTAINABLE BY THIS PROCESS

(71) Applicant: Ovesco Endoscopy AG, Tübingen (DE)

(72) Inventors: Gabor Conrad, Tübingen (DE); Chi-Nghia Ho, Reutlingen (DE); Marc O. Schurr, Tübingen (DE)

(73) Assignee: Ovesco Endoscopy AG, Tübingen (DE)

( * ) Notice: Subject to any disclaimer, the term of this patent is extended or adjusted under 35 U.S.C. 154(b) by 694 days.

(21) Appl. No.: 17/912,349

(22) PCT Filed: Sep. 15, 2022

(86) PCT No.: PCT/EP2022/075705
§ 371 (c)(1),
(2) Date: Sep. 16, 2022

(87) PCT Pub. No.: WO2023/045675
PCT Pub. Date: Mar. 30, 2023

(65) Prior Publication Data
US 2024/0091418 A1    Mar. 21, 2024

(30) Foreign Application Priority Data
Sep. 23, 2021    (EP) .................................... 21198525

(51) Int. Cl.
*A61L 31/04*    (2006.01)
*A61L 31/14*    (2006.01)
(Continued)

(52) U.S. Cl.
CPC ........... *A61L 31/041* (2013.01); *A61L 31/145* (2013.01); *C08J 3/215* (2013.01); *C08L 71/02* (2013.01);
(Continued)

(58) Field of Classification Search
CPC .. A61L 31/041; A61L 31/145; A61L 2400/06; C08J 3/215; C08J 2371/02; C08L 71/02
See application file for complete search history.

(56) References Cited

U.S. PATENT DOCUMENTS

| | | | |
|---|---|---|---|
| 5,976,073 | A | 11/1999 | Ouchi |
| 2006/0070631 | A1 | 4/2006 | Scopton et al. |

(Continued)

FOREIGN PATENT DOCUMENTS

| | | |
|---|---|---|
| DE | 19827255 A1 | 12/1998 |
| EP | 2142112 B1 | 1/2013 |
| WO | 2009070793 A1 | 6/2009 |

OTHER PUBLICATIONS

Extended European Search Report for European Application No. 211 98 525.4, dated Mar. 14, 2022, 9 pages.
(Continued)

*Primary Examiner* — Blessing M Fubara
(74) *Attorney, Agent, or Firm* — Buchanan Ingersoll & Rooney PC

(57) ABSTRACT

A process for manufacturing a viscoelastic injection agent having first and second poloxamers and at least one other component, the process including: a) mixing a first injection agent by mixing a the first poloxamer with the second poloxamer and a third amount of the at least one other component to obtain a predetermined amount of the injection agent; b) determining the viscosity of the injection agent obtained in step at different temperatures at a predetermined shear rate to obtain a present viscosity-over-temperature-curve; c) verifying if a maximum viscosity of the present viscosity-over-temperature-curve lays at a predetermined specific temperature range in a predetermined maximum viscosity range depending on the predetermined shear rate; and d) mixing a new injection agent, having amended at least the first amount of the first poloxamer and/or the (Continued)

second amount of the second poloxamer based on determined properties of the first injection agent.

19 Claims, 4 Drawing Sheets

(51) Int. Cl.
 *C08J 3/215* (2006.01)
 *C08L 71/02* (2006.01)
(52) U.S. Cl.
 CPC ....... *A61L 2400/06* (2013.01); *C08J 2371/02* (2013.01)

(56) References Cited

U.S. PATENT DOCUMENTS

| | | |
|---|---|---|
| 2006/0110357 A1 | 5/2006 | Materna et al. |
| 2013/0096552 A1 | 4/2013 | Brace et al. |
| 2015/0141526 A1* | 5/2015 | Moro .................. A61K 49/006 514/784 |

OTHER PUBLICATIONS

Wedi et al., "Endoscopic submucosal dissection with a novel high viscosity injection solution (LiftUp) in an ex vivo model: a prospective randomized study", Endosc. Int. Open 2019; 07(05): E641-E646.

\* cited by examiner

PROCESS FOR MANUFACTURING AN INJECTION AGENT AND INJECTION AGENT OBTAINABLE BY THIS PROCESS

This application is a U.S. National Phase application of PCT International Application No. PCT/EP2022/075705, filed Sep. 15, 2022, which claims the benefit of EP 21198525.4, filed Sep. 23, 2021, both of which are incorporated by reference herein.

The present disclosure relates to a process for manufacturing an injection agent, especially a lifting agent, which may be used for endoscopic mucosal resection (EMR) and/or endoscopic submucosal dissection (ESD) according to patent claim 1 and relates to an injection agent obtainable by this process according to patent claim 12.

BACKGROUND OF THE DISCLOSURE

Modifications/lesions within the gastro-intestinal tract can be removed via gastroscopy and colonoscopy (endoscopy). In this way, in most cases a fully-invasive surgery can be prohibited. This endoscopic method can be applied for early detected tumors in the oesophagus, the stomach, the small intestine and the large intestine.

The outer rim of the modification/lesion is marked with a coagulation marker to enhance the recognition of the modification/lesion. Then, an injection agent, especially a lifting agent, usually comprising a physiological saline and adrenaline, is injected into the modified portion/lesion of the gastro-intestinal tract. A proper lift-off of the modified portion/lesion from the underground tissue (muscularis propria) is one of the conditions that needs to be satisfied for a successful and secure mucosal resection.

STATE OF THE ART

It is know from DE 198 27 255 A1 that a minimally invasive apparatus for performing an endoscopic resection uses saline as an injection agent.

Furthermore, it is known from US 2006/0070631 A1 that an injection agent that is in a liquid state beneath a first predetermined temperature is forming into a gel when reaching a second predetermined temperature.

Moreover, an injection agent is known from EP 2 142 112 B1 which is applied for an endoscopic mucosal resection and/or an endoscopic submucosal dissection and which has a maximum viscosity between 0.01 Pa s and 16.000.000 Pa s.

However, with these injection agents satisfactory, surgery results cannot be guaranteed. Especially, these injection agents cannot ensure a successful and stable lift-off of the modification/lesion from the underground tissue.

Against this background, in Wedi et al., "*Endoscopic submucosal dissection with a novel high viscosity injection solution (LiftUp) in an ex vivo model: a prospective randomized study*", Endosc. Int. Open 2019; 07(05): E641-E646, DOI: 10.1055/a-0874-1844, there has been developed an injection agent that is a hydrogel with thermo-reversible properties. For a satisfactory endoscopic resection/dissection it is necessary that the injection agent is liquid at room temperature (around 20° C.) and that the viscosity of the injection agent increases when the temperature increases, such that the injection agent forms into a gel at higher temperatures. The maximum gelation and hence the maximum viscosity of the injection agent is to be reached at body temperature (around 37° C., especially between 35.7° C. and 37.7° C., more especially between 36° C. and 38° C.). After exceeding body temperature, the viscosity of the injection agent should decrease again. An injection agent with these properties creates a gel cushion between the mucosa and the muscularis propria facilitating the EMR/ESD treatment. Hence, for a successful EMR/ESD treatment, an injection agent should have its maximum viscosity at body temperature.

An injection agent having the above described properties comprises a first and a second poloxamer. Poloxamers are synthetic block copolymers having, especially consisting of, polyoxypropylene and polyoxyethylene chains. Poloxamers have thermo-reversible properties with a characteristic sol-to-gel transition that depends on the temperature. At low temperatures (around room temperature (around 20° C.) and below), the chains of the poloxamers are dissolved and hence the poloxamer is a liquid. With the temperature rising, the chains form into micelles and hence the viscosity of the poloxamer is increased. The micelles interconnect at a predetermined critical micelle temperature and form into a grid such that the poloxamer is a gel at this temperature. Above the predetermined critical micelle temperature the grid dissipates into micelles again.

Hence, the share/the concentration of the first and second poloxamer in the injection agent determines the viscosity of the injection agent. Only a proper share/concentration of each of the first and second poloxamer within the injection agent leads to the injection agent having its maximum viscosity at body temperature.

However, it has been found out in practice, that a viscosity-over-temperature-curve of a poloxamer of one production unit differs from the viscosity-over-temperature-curve of the same poloxamer of another production unit. This means, when using two samples of the injection agent having the same amount of the first and the second poloxamer but the first and/or second poloxamer originating from different production units, a viscosity-over temperature-curve of one sample differs from the one of the other sample. Thus, among a plurality of injection agents comprising the first and the second poloxamer originating from different production units, even if the same concentration of each of the first and second poloxamer is used for all of the plurality of injection agents, the maximum viscosity is likely to be present at different temperatures and to have different values among the plurality of injection agents. Hence, the quality of the injection agent is not consistent and depends on the used production unit of the first and second poloxamer.

SHORT DESCRIPTION OF THE DISCLOSURE

Hence, there exists the need to provide a process for manufacturing an injection agent of a consistent quality, especially for manufacturing an injection agent that has its maximum viscosity at body temperature independent from the production unit of the first and second poloxamers used to manufacture the injection agent.

The above described problem can be solved by the process for manufacturing an injection agent, especially a lifting agent, according to patent claim 1 and by an injection agent obtainable by this process according to claim 12. Further, advantageous embodiments of the present disclosure are described in the dependent patent claims.

According to the disclosure, the process for manufacturing an injection agent, especially a lifting agent, preferably used for endoscopic resection techniques, which is a viscoelastic liquid and includes a first and a second poloxamer (the first and the second poloxamer being different from each other) and at least one other component, comprises the following steps:
  a) Mixing a first injection agent by mixing a first amount of the first poloxamer with a second amount of the second poloxamer and a third amount of the at least one other component to obtain a predetermined amount of the first injection agent;
  b) Determining the viscosity of the injection agent obtained in step a) at different (preselected) temperatures, especially in a temperature range between 20° C. and 45° C., at a predetermined shear rate, especially a shear rate of around 95 $s^{-1}$ (more exactly at 95.87 $s^{-1}$), to obtain a present viscosity-over-temperature-curve;
  c) Verifying if a maximum viscosity of the present viscosity-over-temperature-curve lays in a predetermined specific temperature range, especially between 36° C. and 38° C., and in a predetermined maximum viscosity range depending on the predetermined shear rate;
  d) Mixing a new injection agent, especially in the predetermined amount, having amended at least the first amount of the first poloxamer and/or the second amount of the second poloxamer based on the previously produced injection agent, if the maximum viscosity of the present viscosity-over-temperature-curve lays not in the predetermined specific temperature range and in the predetermined maximum viscosity range; and
  e) Repeating steps b) and c) and if necessary step d) so often until it is determined in step c) that the maximum viscosity of the present viscosity-over-temperature-curve lays in the predetermined specific temperature range and in the predetermined maximum viscosity range.

With this process, the share/concentration of the first and/or the second poloxamer within the injection agent can be easily adjusted in a target-oriented way to obtain an injection agent that contributes to a successful endoscopic resection/dissection. By the process, the concentration of the first and second poloxamer within the injection agent is adjusted for every new production unit such that the thus produced injection agent always fulfils the condition of step c). Hence, when performing the process according to the disclosure so long until it can be verified in step c) that the maximum viscosity of the present viscosity-over-temperature-curve is present in the predetermined specific temperature range, especially between 36° C. and 38° C., and lays in the predetermined maximum viscosity range, a final injection agent can be received that can be used for EMR and/or ESD treatment.

In general, the viscosity of the injection agent is dependent on the first amount of the first poloxamer and the second amount of the second poloxamer. Usually, the first amount is different from the second amount. Each of the first amount and the second amount is different from the third amount. The higher the concentration of each of the poloxamers in the injection agent, the more micelles are formed with rising temperature, which leads to a higher viscosity of the injection agent.

It has turned out that the viscosity of the injection agent at body temperature may not fall below a critical value. Beneath the critical viscosity value, the injection agent cannot gel. However, the maximum viscosity of the injection agent decreases with aging, wherein at least for two years the functionality of the injection agent has to be guaranteed. Hence, for guaranteeing the full functionality of the injection agent even after two years of storage, the maximum viscosity of the injection agent at body temperature (between 36° C. and 38° C.) should not fall below a predetermined lower maximum viscosity.

Moreover, it is a further requirement for the injection agent to be injectable at room and body temperature through an injection needle, especially having a diameter of ≥0.58 mm. Hence, the maximum viscosity of the injection agent may not exceed a predetermined upper maximum viscosity.

Hence, advantageously, in step c) it is not only investigated if the viscosity of the injection agent reaches within the predetermined specific temperature range its maximum but also if the maximum viscosity of the injection agent lays at a predetermined specific temperature (typically at body temperature) within a predetermined maximum viscosity range.

Step d) ensures advantageously that, based on the outcome of the verification in step c), the amount(s) of the first and/or second poloxamer is/are adjusted. In this way, the final injection agent with the desired properties defined in step c) can be obtained quickly and easily.

Preferably, the mixing of the injection agent in step a) is performed in a clean room area, especially under a clean bench class A. In this way, contamination of the injection agent can be prohibited.

In an advantageous embodiment, the first amount of the first poloxamer is increased if the maximum viscosity of the present viscosity-over-temperature-curve is below the predetermined maximum viscosity range (that should be present) in the predetermined specific temperature range. Alternatively, the first amount of the first poloxamer is reduced if the maximum viscosity of the present viscosity-over-temperature-curve is above the predetermined maximum viscosity range (that should be present) in the predetermined specific temperature range. Additionally or alternatively to the first two options, the second amount of the second poloxamer is increased if the temperature range, where the maximum viscosity of the present viscosity-over-temperature-curve is determined, is below the predetermined specific temperature range. Alternatively, the second amount of the second poloxamer is reduced if the temperature range, where the maximum viscosity of the present viscosity-over-temperature-curve is determined, is above the predetermined specific temperature range.

To summarize, based on the outcome of step c), the first amount of the first poloxamer and/or the second amount of the second poloxamer can be adjusted. Hence, based on the outcome in step c), the composition of the injection agent can be amended easily and in a target-oriented way such that the final injection agent with the desired properties defined in step c) can quickly be obtained.

In a preferred embodiment, the predetermined specific temperature range is defined by a lower temperature of 36° C. and an upper temperature of 38° C. (between 35.7° C. and 37.7° C.), especially between 37.0° C. and 37.5° C., and the predetermined maximum viscosity range is defined by a lower maximum viscosity of 1.8 Pa s and an upper maximum viscosity of 1.9 Pa s at a shear rate of around 95 $s^{-1}$ (more exactly at 95.87 $s^{-1}$).

A shear rate of 95 $s^{-1}$ (more exactly of 95.87 $s^{-1}$) simulates an injection of the injection agent with an injection needle having a diameter of 0.7 mm. It has been found out that the lower maximum viscosity at body temperature should not fall below 1.8 Pa s such that the gelation of the injection agent is possible even after storing it for two years. Moreover, if the maximum viscosity at body temperature does not exceed 1.9 Pa s, the injection agent is injectable with an injection needle of 0.58 mm.

It is further imaginable that the at least one other component is water, especially distilled water, more preferred double distilled water, especially with a concentration of 81 wt % to 85 wt % in the injection agent, whose amount has to be adjusted depending on step d).

Hence, if the total amount of the first and second poloxamer has been increased by a certain amount in step d), the amount of water has to be decreased by the certain amount and vice versa.

In another embodiment, additionally to the at least one component, two further components are mixed with the first and second poloxamer in step a), wherein the amount of each of the two further components in the injection agent remains unchanged independent of step d).

Hence, independent if the total amount of the first and second poloxamer has been amended in step d), the amount of each of the two further components stays always the same.

Preferably, the two further components are sodium chloride and a coloring agent, especially methylene blue, toluidine blue or indigo carmine, the concentration of sodium chloride in the injection agent being 0.9 wt % and the concentration of the coloring agent in the injection agent being 0.02 wt %.

Hence, the injection agent manufactured by the process according to the disclosure, is a composition of the first poloxamer, the second poloxamer, water, sodium chloride (NaCl) and a coloring agent.

In a preferred embodiment of the present disclosure, mixing of an injection agent comprises the following steps:
  i) Determining the predetermined amount of the injection agent;
  ii) Determining and measuring the first amount of the first poloxamer such that based on the predetermined amount of the injection agent the concentration of the first poloxamer in the injection agent is between 14 wt % and 17 wt %, especially between 14.9 wt % and 15.6 wt %;
  iii) Determining and measuring the second amount of the second poloxamer such that based on the predetermined amount of the injection agent the concentration of the second poloxamer in the injection agent is between 0.5 wt % and 1 wt %, especially between 0.5 wt % and 0.6 wt %;
  iv) Measuring the amount of sodium chloride such that based on the predetermined amount of the injection agent the concentration of sodium chloride in the injection agent is 0.9 wt %;
  v) Measuring the amount of the coloring agent such that based on the predetermined amount of the injection agent the concentration of the coloring agent in the injection agent is 0.02 wt %;
  vi) Determining and measuring the (third) amount of water by subtracting the sum of the first amount of the first poloxamer, the second amount of the second poloxamer, the amount of sodium chloride and the amount of the coloring agent from the predetermined amount of the injection agent; and
  vii) Mixing the measured amounts of all the components described in steps ii) to vi) with each other.

After performing all of steps i) to vii) an injection agent can be obtained. This process for mixing an injection agent is easy and quick to perform. Step vi) emphasizes that the amount of water depends on the predetermined first amount of the first poloxamer and the predetermined second amount of the second poloxamer.

It is preferred that the first poloxamer is Kolliphor P407 and that the second poloxamer is Kolliphor P188.

Kolliphor P407 and Kolliphor P188 are both a (white) coarse-grained powder of a waxy consistency. Kolliphor P407 has a pH-value of 6 to 9 and Kolliphor P188 has a pH-value of 5 to 7.5. Both poloxamers are readily soluble in water.

In an advantageous embodiment of the process, in step c) of the above described process it is verified if the present viscosity-over-temperature-curve lays, especially in the predetermined specific temperature range, between a minimum viscosity-over-temperature-curve and a maximum viscosity-over-temperature-curve that both have been determined at the predetermined shear rate used in step b);
  in step d) a new injection agent is mixed, having amended at least the first amount of the first poloxamer and/or the second amount of the second poloxamer based on the previously produced injection agent, if the present viscosity-over-temperature-curve, especially at the predetermined specific temperature range, does not lay between the minimum viscosity-over-temperature-curve and the maximum viscosity-over-temperature-curve; and
  In step e) steps b) and c) and if necessary step d) are repeated so often until it is determined in step c) that the maximum viscosity of the present viscosity-over-temperature-curve lays between the minimum viscosity-over-temperature-curve and the maximum viscosity-over-temperature-curve.

Hence, in the advantageous embodiment, the maximum viscosity of the present viscosity-over-temperature-curve not only has to lay within the predetermined maximum viscosity range and in the predetermined specific temperature range, but the whole present viscosity-over-temperature curve has to lay between a minimum and a maximum viscosity-over-temperature-curve to obtain the final injection agent usable for EMR and/or ESD. Hence, when the present viscosity-over-temperature curve of the injection agent lays between the minimum and the maximum viscosity-over-temperature-curve, it can be ensured that the injection agent is injectable at room temperature and at body temperature with an injection needle of a diameter of 0.58 mm. Moreover, the injection agent fulfilling this condition is easy to handle and has the necessary properties to be used in EMR and/or ESD.

Preferably, in the advantageous embodiment of the process, in step d) the first amount of the first poloxamer is increased if the maximum viscosity of the present viscosity-over-temperature-curve is below the maximum viscosity of the minimum viscosity-over-temperature-curve. Alternatively, the first amount of the first poloxamer is reduced if the maximum viscosity of the present viscosity-over-temperature-curve is above the maximum viscosity of the maximum viscosity-over-temperature-curve. Additionally or alternatively to the first two options, the second amount of the second poloxamer is increased if the temperature range, where the maximum viscosity of the present viscosity-over-temperature-curve is determined, is below the temperature range, where the maximum viscosity of the minimum-viscosity-over-temperature-curve is determined. Alternatively, the second amount of the second poloxamer is reduced if the temperature range, where the maximum viscosity of the present viscosity-over-temperature-curve is determined, is above the temperature range, where the maximum viscosity of the minimum-viscosity-over-temperature-curve is determined.

According to a further preferred embodiment, the minimum viscosity-over-temperature-curve and the maximum viscosity-over-temperature-curve are determined from the following table 1, whose values have been determined at a shear rate of 95 s$^{-1}$ (more exactly of 95.87 s$^{-1}$):

TABLE 1

| Temperature [° C.] | Minimum viscosity [Pa s] | Maximum viscosity [Pa s] |
| --- | --- | --- |
| 20 | 0 | 1 |
| 23 | 0 | 1 |
| 27 | 0 | 1.9 |
| 30 | 0.54 | 1.9 |
| 33 | 1.08 | 1.9 |
| 36 | 1.62 | 1.9 |
| 37 | 1.8 | 1.9 |
| 38 | 1.62 | 1.9 |
| 40 | 1.26 | 1.9 |
| 45 | 0.36 | 1.9 |

Moreover, the above defined problem is solved by an injection agent obtainable by the process described above. It can be ensured that such an injection agent supports a successful EMR and/or ESD.

SHORT DESCRIPTION OF THE FIGURES

The present disclosure and preferred embodiments thereof are explained using the accompanied drawings, wherein.

DETAILED DESCRIPTION OF THE DISCLOSURE

Figure 1:
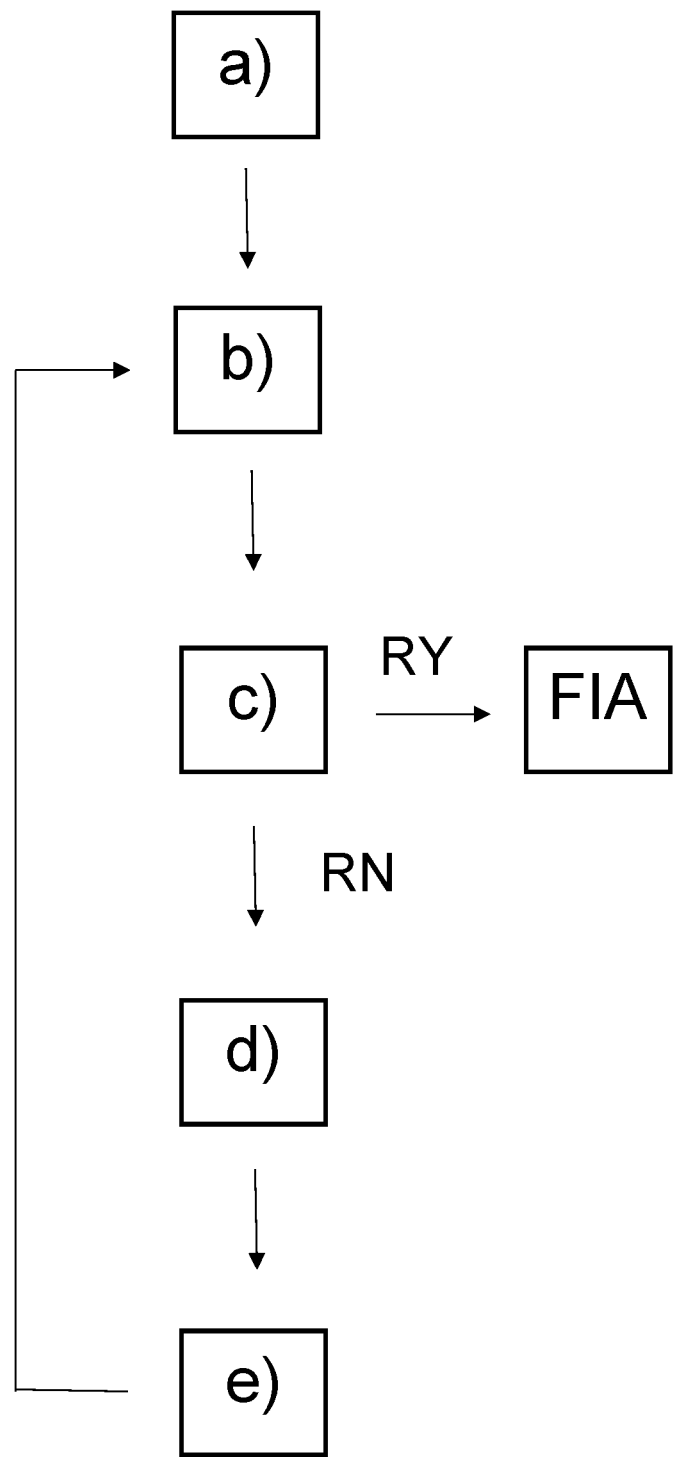
FIG. 1 is a flow diagram showing schematically the process according to the disclosure.

FIG. 1 is a flow diagram showing schematically the process according to the disclosure. For manufacturing an injection agent, at first step a) of the process according to the disclosure is performed. Hence, at first a first injection agent is mixed. Preferably, therefore steps i) to vii) explained above are performed. Hence, a predetermined amount of the injection agent, i.e. 200 g, is determined according to step i). Then, according to step ii), the first amount of the first poloxamer is determined, wherein the concentration of the first poloxamer in the injection agent is between 14 wt % and 17 wt %. For example, here a concentration of the first poloxamer of 15 wt % is selected, which means that 30 g (=0.15×200 g) of the first poloxamer is measured/weighed. Then, according to step iii), the second amount of the second poloxamer is determined, wherein the concentration of the second poloxamer in the injection agent is between 0.5 wt % and 1 wt %. For example, here a concentration of 0.5 wt % of the second poloxamer is selected, which means that 1 g (=0.005×200 g) of the second poloxamer is measured/weighed. Then, according to step iv), the amount of sodium chloride having a concentration of 0.9 wt % in the injection agent is measured/weighed, which would be 1.8 g (=0.009× 200 g). Afterwards, according to step v), the amount of the coloring agent, usually methylene blue, having a concentration of 0.02 wt % in the injection agent is measured/weighed which would be 0.04 g (=0.0002×200 g). At last, according to step vi), the amount of water is determined from subtracting the sum of each of the amounts of the first poloxamer, the second poloxamer, the sodium chloride and the coloring agent from the predetermined amount of the injection agent and is measured/weighed, which would be 167.16 g (=200 g−(30 g+1 g+1.8 g+0.04 g). Then, all the measured/weighed amounts of all five components (the first poloxamer, the second poloxamer, the sodium chloride, the coloring agent and water) are mixed with each other to obtain 200 g of the first injection agent. Of course, steps ii) to v) can be performed in any desired order.

Then, the viscosity of the first injection agent can be determined as described in step b) of the process according to the disclosure. Therefore, a rheometer can be used. The rheometer measures the viscosity of the injection agent at preselected temperatures between 20° C. and 45° C. and here at a shear rate of 95 s−1 (more exactly 95.87 s$^{-1}$), which simulates the injection of the injection agent through an injection needle with a diameter of 0.7 mm. In general, the viscosity measurement could be performed at any shear rate. In this case, the absolute values of the lower maximum viscosity and of the upper maximum viscosity would be different from 1.8 Pa s and 1.9 Pa s, respectively. However, the same share rate has to be used when different viscosity-over-temperature-curves are compared with each other. At every measuring temperature, the injection agent is tempered for a preselected time unit, usually for five minutes, to guarantee that the temperature is homogenous throughout the entire volume of the injection agent. From the measuring results of the rheometer, a viscosity-over-temperature-curve of the present injection agent is obtained. Examples for present viscosity-over-temperature-curves of different injection agents are given in FIG. 2 to FIG. 6 and in FIG. 8.

Then, it is verified in step c) if the maximum viscosity of the present viscosity-over-temperature-curve of the injection agent lays in a target region being defined by the predetermined specific temperature range and the predetermined maximum viscosity range. If it can be verified that the maximum viscosity of the present viscosity-over-temperature-curve lays in the predetermined specific temperature range and in the predetermined maximum viscosity range (positive result: YES), then RY in FIG. 1 applies, the final injection agent FIA is obtained and the process is ended. If it is verified in step c) that the maximum viscosity of the present viscosity-over-temperature-curve does not lay in the predetermined specific temperature range and in the predetermined maximum viscosity range (negative result: NO), RN in FIG. 1 applies and the process proceeds with step d). In step d), a new injection agent is mixed, preferably by performing steps i) to vii), wherein the first amount of the first poloxamer and/or the second amount of the second poloxamer is amended compared to the first injection agent. This depends on the way the maximum viscosity of the first injection agent deviates from the target region. Examples for the maximum viscosity of the injection agent deviating from the target region are given in FIG. 2 to FIG. 5 explained below.

Then, according to step e), steps b) and c) and if necessary step d) have to be performed again so often until it is determined in step c) that the maximum viscosity of the present injection agent lays in the target region. Then RY applies and the final injection agent FIA is obtained and the process is ended.

Preferably, the final injection agent is filled into a primary packaging. Therefore, at first, the primary packaging comprising a vial adapted to carry the final injection agent, a septum and a flip-off cap is sterilized using a validated steam sterilization cycle at a sterilization temperature of 120° C. for 40 min and is then dried for 20 min. Then, the injection agent is produced to achieve the final injection agent with the help of the above described process. The final injection agent is then filled into the sterilized vial of the sterilized primary packaging. The vial containing the final injection agent is closed and is then sterilized using a validated steam sterilization cycle at a sterilization temperature of 132° C. for 20 min and is dried for 1 min afterwards.

Now, by the example of FIG. 2 to FIG. 5, cases that cause the result RN in step c) are explained. All curves shown in FIG. 2 to FIG. 5 have been determined at a shear rate of 95 s$^{-1}$ (more exactly of 95.87 s$^{-1}$). All viscosity-over-temperatures shown in this disclosure have been measured with a rheometer (Viscotester iQ, ThermoFisher Scientific). The tests in the rheometer have been carried out using a cup-cylinder combination.

Figure 2:
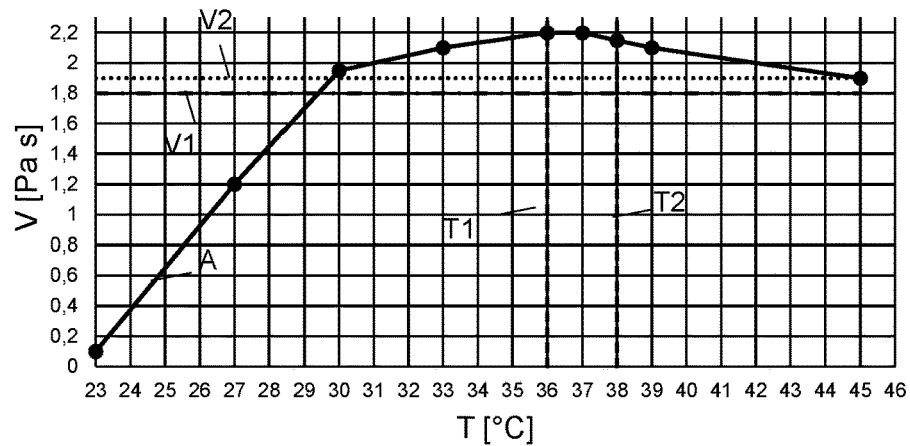
FIG. 2 shows a viscosity-over-temperature-diagram, in which a maximum viscosity of a present-viscosity-over-temperature-curve exceeds a predetermined maximum viscosity range.

FIG. 2 shows a viscosity-over-temperature-diagram with an exemplary present-viscosity-over-temperature-curve of an injection agent A obtained in step b) of the process according to the disclosure. Moreover, in FIG. 2 as well as in FIG. 3 to FIG. 6, an upper maximum viscosity V2, which is set to be at 1.9 Pa s, and a lower maximum viscosity V1, which is set to be at 1.8 Pa s, define the predetermined maximum viscosity range described in step c) of the process according to the disclosure. In FIG. 2 as well as in FIG. 3 to FIG. 6, a lower temperature T1, which is 36° C., and an upper temperature T2, which is 38° C., define the predetermined specific temperature range described in step c) of the process according to the disclosure, which is a body temperature range. In the temperature range between T1 and T2, the maximum viscosity of the injection agent should be detected. This means, that the maximum viscosity of the injection agent is supposed to not fall below the lower maximum viscosity V1 (1.8 Pa s) and to not exceed the upper maximum viscosity V2 (1.9 Pa s) in the predetermined specific temperature range of T1 (36° C.) and T2 (38° C.).

As described in step c) of the process according to the disclosure, it has to be verified, if the maximum viscosity of the present viscosity-over-temperature-curve of the injection agent A shown in FIG. 2 lays in the temperature range of T1 and T2 and in the predetermined maximum viscosity range of V1 and V2.

In fact, the maximum viscosity of injection agent A can be determined between T1 and T2. However, in the temperature range of T1 and T2, the maximum viscosity of injection agent A lays between 2.15 Pa s and 2.2 Pa s. Hence, the maximum viscosity of injection agent A exceeds the upper maximum viscosity V2.

Thus, in case of FIG. 2, according to step d), a new injecting agent has to be mixed. Hence, steps i) to vii) have to be performed again. Compared with injection agent A, less of the first poloxamer has to be used, as the maximum viscosity of injection agent A exceeds the upper maximum viscosity V2. For example, if 30 g of the first poloxamer have been used to mix injection agent A, for the new injection agent only 25 g of the first poloxamer should be used. In this case, compared with injection agent A, 5 g more water has to be used for the new injection agent while the amounts of the second poloxamer, the sodium chloride and the coloring agent stay the same. Then, according to step e), steps b) and c) have to be performed. If it can be verified in step c) that the maximum viscosity of the new injection agent lays in the temperature range of T1 and T2 and does not fall below the lower maximum viscosity V1 and does not exceed the upper maximum viscosity V2, a final injection agent is received and the process can be ended. If in step c) it is determined that the maximum viscosity of the new injection agent lays in the predetermined specific temperature range of T1 to T2 but not in the predetermined maximum viscosity range of V1 to V2, step d) and steps b), c) and if necessary step d) have to be repeated so often until it can be determined in step c) that the maximum viscosity of another newly mixed injection agent lays in the predetermined specific temperature range of T1 and T2 and in the predetermined maximum viscosity range of V1 and V2.

Figure 3:
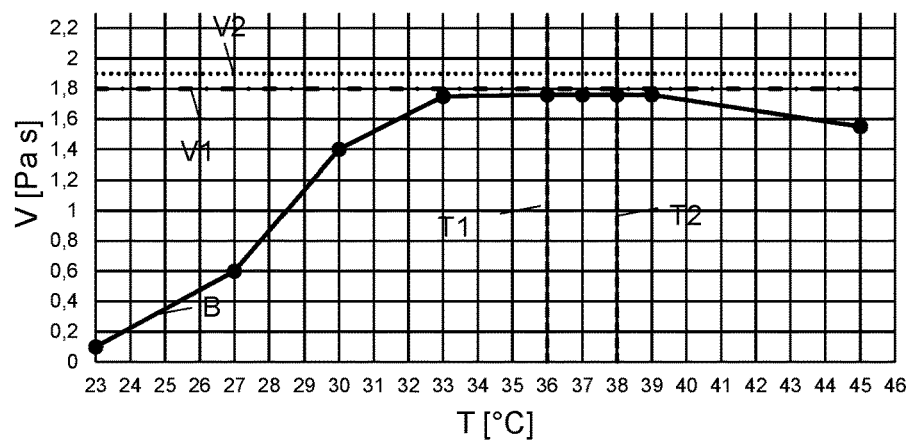
FIG. 3 shows a viscosity-over-temperature-diagram, in which a maximum viscosity of a present-viscosity-over-temperature-curve is below a predetermined maximum viscosity range.

FIG. 3 shows a viscosity-over-temperature-diagram with an exemplary present-viscosity-over-temperature-curve of an injection agent B obtained in step b) of the process according to the disclosure. The maximum viscosity of the injection agent B lays within the predetermined specific temperature range of T1 and T2 but below the lower maximum viscosity V1. Hence, in step d), when mixing a new injection agent, more of the first poloxamer has to be used, while the amounts of each of the second poloxamer, the sodium chloride and the coloring agent stay the same compared to the injection agent B. For the new injection agent, the amount of water has to be decreased by the same amount by which the first amount of the first poloxamer has been increased.

Figure 4:
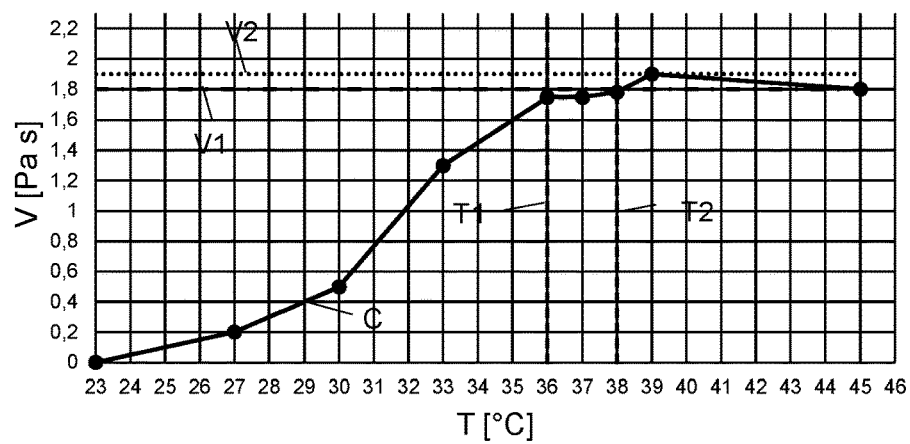
FIG. 4 shows a viscosity-over-temperature-diagram, in which the temperature range, at which the maximum viscosity of a present-viscosity-over-temperature-curve is determined, is above a predetermined specific temperature range.

FIG. 4 shows a viscosity-over-temperature-diagram with an exemplary present-viscosity-over-temperature-curve of an injection agent C obtained in step b) of the process according to the disclosure. The maximum viscosity of the injection agent C is determined at 39° C. and hence above the predetermined specific temperature range of T1 and T2 (above T2) while it equals the upper maximum viscosity V2. Thus, the maximum viscosity of the injection agent C lays above the predetermined specific temperature range of T1 and T2 but within the predetermined maximum viscosity range of V1 to V2. Hence, in step d), when mixing a new injection agent, less of the second poloxamer has to be used while the amounts of each of the first poloxamer, the sodium chloride and the coloring agent stay the same, compared to the injection agent C. For the new injection agent, the amount of water has to be increased by the same amount by which the second amount of the second poloxamer has been decreased.

Figure 5:
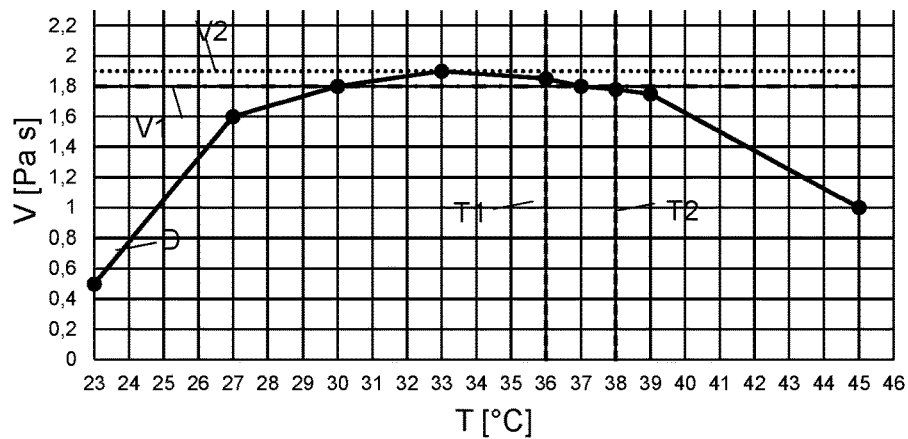
FIG. 5 shows a viscosity-over-temperature-diagram, in which the temperature range, at which the maximum viscosity of a present-viscosity-over-temperature-curve is determined, is below a predetermined specific temperature range.

FIG. 5 shows a viscosity-over-temperature-diagram with an exemplary present-viscosity-over-temperature-curve of an injection agent D obtained in step b) of the process according to the disclosure. The maximum viscosity of the injection agent D is determined at 33° C. and hence below the predetermined specific temperature range of T1 and T2 (below T1) while it equals the upper maximum viscosity V2. Thus, the maximum viscosity of the injection agent D lays below the predetermined specific temperature range of T1 and T2 but within the predetermined maximum viscosity range of V1 to V2. Hence, in step d), when mixing a new injection agent, more of the second poloxamer has to be used while the amounts of each of the first poloxamer, the sodium chloride and the coloring agent stay the same, compared to the injection agent D. For the new injection agent, the amount of water has to be decreased by the same amount by which the second amount of the second poloxamer has been increased.

Of course, it is also possible, that the cases of FIG. 2 or FIG. 3 are mixed with the cases of FIG. 4 or FIG. 5. For example, the maximum viscosity of the present viscosity-over-temperature-curve of the present injection agent lays above the upper maximum viscosity (as in FIG. 2) and above the upper temperature (as in FIG. 4). In this case, the first amount of the first poloxamer and the second amount of the second poloxamer both would have to be decreased. If for example, the maximum viscosity of the present viscosity-over-temperature-curve of the present injection agent lays above the upper maximum viscosity (as in FIG. 2) and below the lower temperature (as in FIG. 5), the first amount of the first poloxamer would have to be decreased while the second amount of the second poloxamer would have to be increased.

Figure 6:
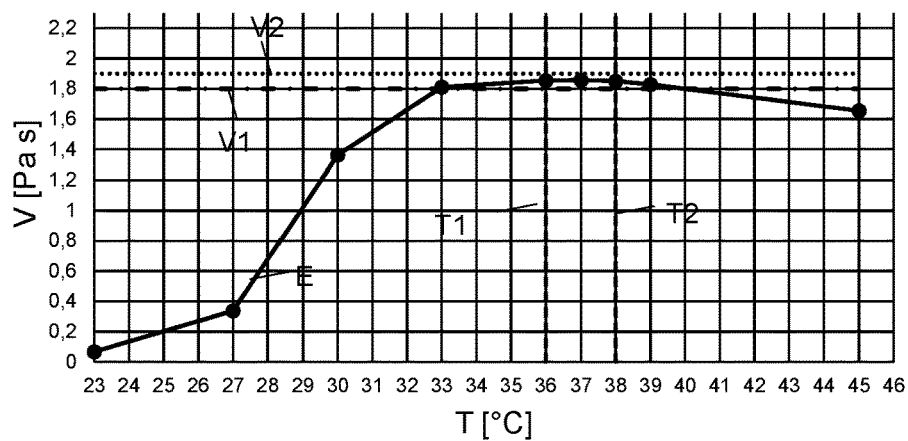
FIG. 6 shows a viscosity-over-temperature-diagram, in which a present viscosity-over-temperature-curve lays in a predetermined maximum viscosity range and in a predetermined specific temperature range.

FIG. 6 shows a viscosity-over-temperature-diagram with an exemplary present-viscosity-over-temperature-curve of an injection agent E obtained in step b) of the process according to the disclosure. The present-viscosity-over-temperature-curve of the injection agent E was obtained at a shear rate of 95 $s^{-1}$ (more exactly of 95.87 $s^{-1}$). The maximum viscosity of the injection agent E is between 36° C. and 38° C. and hence within the predetermined specific temperature range of T1 and T2, while it lays with a value of 1.85 Pa s between the lower and the upper maximum viscosity V1 and V2. Thus, the maximum viscosity of the injection agent E lays in the predetermined specific temperature range of T1 and T2 and within the predetermined maximum viscosity range of V1 to V2. Hence, the injection agent E is a final injection agent and can be used for EMR and/or ESD treatment.

Figure 7:
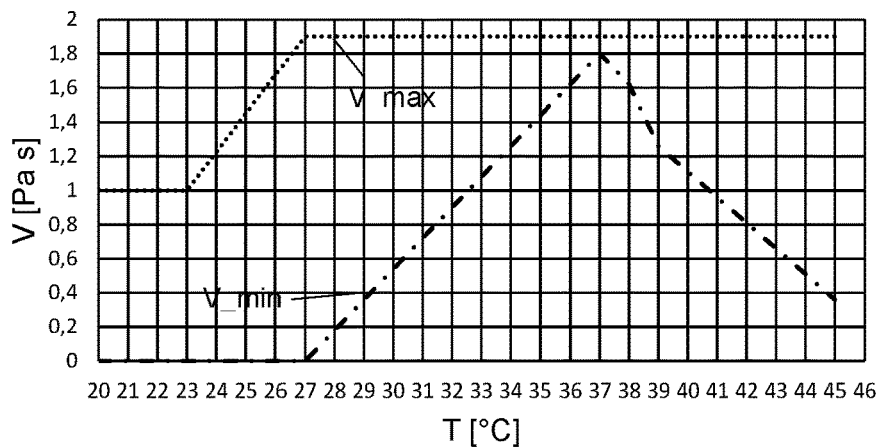
FIG. 7 shows a viscosity-over-temperature-diagram, in which a maximum viscosity-over-temperature-curve and a minimum viscosity-over-temperature-curve are shown.

FIG. 7 shows a viscosity-over-temperature-diagram, in which the maximum viscosity-over-temperature-curve V_max and the minimum viscosity-over-temperature-curve V_min described in Table 1 are shown graphically. These curves apply for a shear rate of 95 $s^{-1}$ (more exactly of 95.87 $s^{-1}$). A present viscosity-over-temperature-curve (not shown here) should lay between the maximum viscosity-over-temperature-curve V_max and the minimum viscosity-over-temperature-curve V_min to fulfil the condition of modified step c). It gets clear from FIG. 7, that at around 37° C. the viscosity of an injection agent should not fall below 1.8 Pa s and should not exceed 1.9 Pa s.

Figure 8:
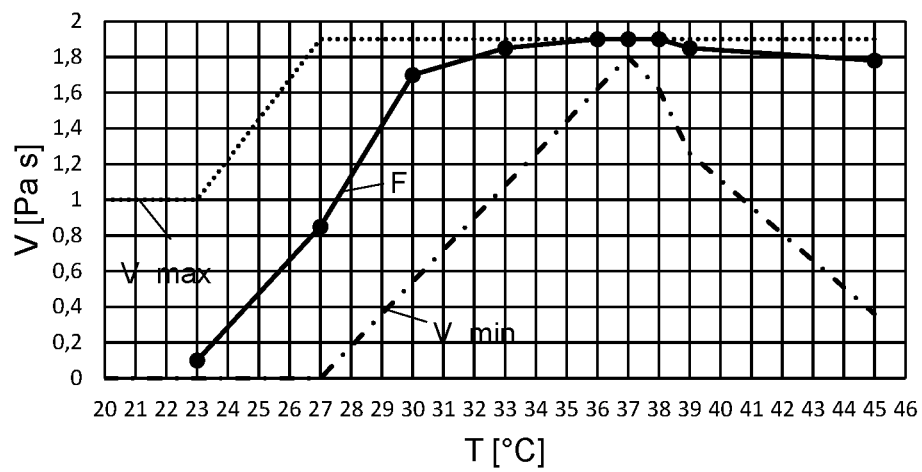
FIG. 8 shows a viscosity-over-temperature-diagram, in which a maximum viscosity-over-temperature-curve, a present viscosity-over-temperature-curve and a minimum viscosity-over-temperature-curve are shown.

FIG. 8 shows a viscosity-over-temperature-diagram, in which a present viscosity-over-temperature-curve lays F between (or on) the maximum viscosity-over-temperature-curve V_max and the minimum viscosity-over-temperature-curve V_min. These curves apply for a shear rate of 95 $s^{-1}$ (more exactly of 95.87 $s^{-1}$). Hence, the injection agent F meets the condition of modified step c) and is hence a final injection agent usable for EMR and/or ESD treatment.

Figure 9:
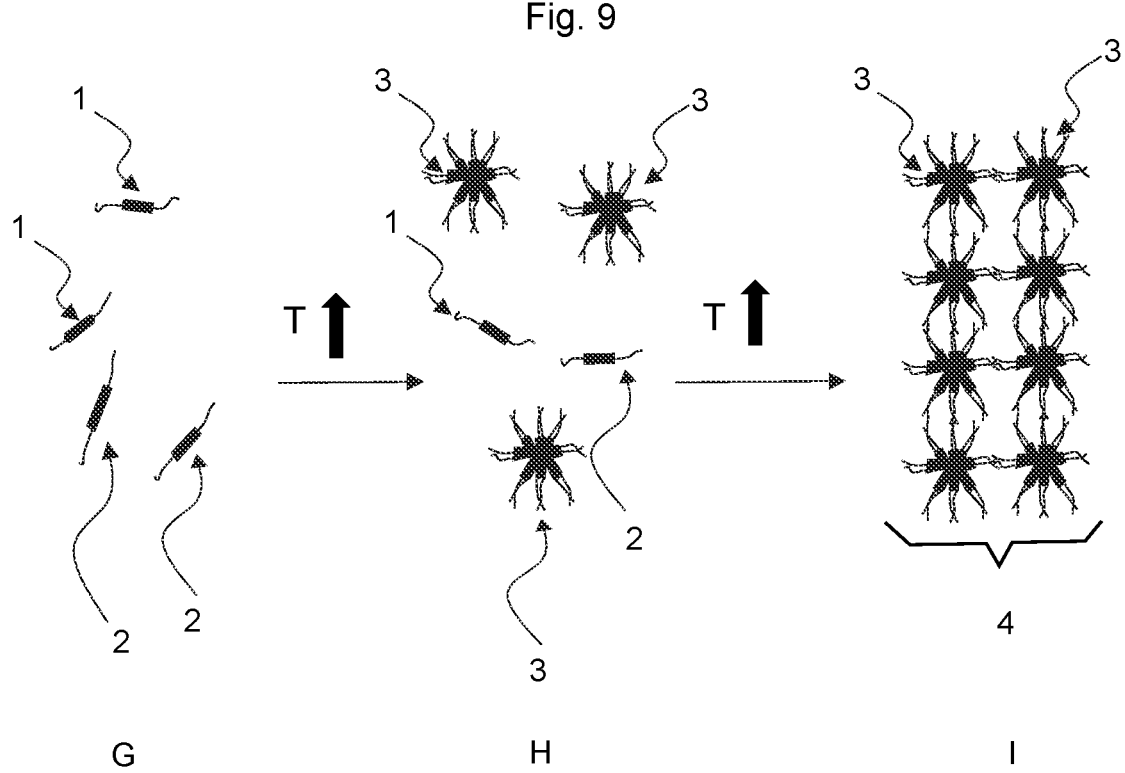
FIG. 9 is a schematic diagram showing the micellar mechanism of poloxamers.

FIG. 9 is a schematic diagram showing the micellar mechanism of a poloxamer. In state G, the poloxamer contains polyoxypropylene chains 1 and polyoxyethylene chains 2. In state G, the temperature is around 20° C. or less. Hence, in state G, the poloxamer is in a liquid state. When the temperature rises from state G, the chains 1 and 2 start to form into micelles 3. This is shown in state H. In state H, beside micelles 3, still a few single chains 1 and 2 are present. Hence, in state H, the viscosity of the poloxamer is increased compared with state G. When the temperature rises from state H, the micelles 3 form into a grid 4. This is shown in state I. In state I, the poloxamer has the form of a gel. Hence, in state I, the poloxamer has reached its maximum viscosity. If the temperature is further increased from state I (not shown), the grid 4 disintegrates into micelles 3 again. Hence, when the temperature is increased from state I, the viscosity of the poloxamer decreases again.

LIST OF REFERENCE SIGNS 1 polyoxypropylene chain
2 polyoxyethylene chain
3 micelle
4 grid
A to F different injection agents
G liquid state of poloxamer
H state of poloxamer with increased viscosity compared to state G
I gel state of poloxamer
RN result NO in step c)
RY result YES in step c)
FIA final injection agent
T1 lower temperature
T2 upper temperature
V1 lower maximum viscosity
V2 upper maximum viscosity
V_min minimum viscosity-over-temperature-curve
V_max maximum viscosity-over-temperature-curve

The invention claimed is:

1. A process for manufacturing an injection agent comprising a viscoelastic liquid including water, a first poloxamer, and a second poloxamer, the process comprising:
 a) producing a first injection agent by mixing a specific amount of the water with a first amount of the first poloxamer, wherein a concentration of the first poloxamer in the first injection agent is in an amount between 14 wt % and 17 wt %, and with a second amount of the second poloxamer, wherein a concentration of the second poloxamer in the first injection agent is in an amount between 0.5 wt % and 1 wt %, thereby obtaining a predetermined amount of the first injection agent;
 b) determining a viscosity of the first injection agent obtained in step a) at different temperatures at a predetermined shear rate of 95 reciprocal seconds ($s^{-1}$) to obtain a present viscosity-over-temperature-curve;
 c) verifying if a maximum viscosity of the present viscosity-over-temperature-curve lays in a predetermined specific temperature range and in a predetermined maximum viscosity range depending on the predetermined shear rate, wherein the predetermined specific temperature range comprises a range between a lower temperature (T1) of 36° C. and an upper temperature (T2) of 38° C., and wherein the predetermined maximum viscosity range comprises another range between a lower maximum viscosity (V1) of 1.8 Pascal-second (Pa·s) and an upper maximum viscosity (V2) of 1.9 Pa·s;

d) producing a new injection agent by changing at least the first amount of the first poloxamer, the second amount of the second poloxamer, or a combination thereof based on the first injection agent obtained in step a), if the maximum viscosity of the present viscosity-over-temperature-curve obtained in step b) lays outside of the predetermined specific temperature range and the predetermined maximum viscosity range; and e) repeating steps b) and c) and, when necessary, step d) until it is determined in step c) that the maximum viscosity of the present viscosity-over-temperature-curve lays in the predetermined specific temperature range and in the predetermined maximum viscosity range; and wherein in step d), (i) the first amount of the first poloxamer is increased if the maximum viscosity of the present viscosity-over-temperature-curve is below the predetermined maximum viscosity range in the predetermined specific temperature range or the first amount of the first poloxamer is reduced if the maximum viscosity of the present viscosity-over-temperature-curve is above the predetermined maximum viscosity range in the predetermined specific temperature range, (ii) the second amount of the second poloxamer is increased if the temperature range at which the maximum viscosity of the present viscosity-over-temperature-curve is determined, is below the predetermined specific temperature range or the second amount of the second poloxamer is reduced if the temperature range at which the maximum viscosity of the present viscosity-over-temperature-curve is determined is above the predetermined specific temperature range, or (iii) a combination of (i) and (ii).

2. The process for manufacturing an injection agent according to claim 1, wherein in step b) the viscosity of the injection agent is determined in a temperature range between 20° C. and 45° C.

3. The process for manufacturing an injection agent according to claim 1, wherein the amount of the water is adjusted depending on step d).

4. The process for manufacturing an injection agent according to claim 1, wherein step a) further comprises mixing sodium chloride and a coloring agent with the water, the first poloxamer, and the second poloxamer, and wherein the amounts of the sodium chloride and the coloring agent in the injection agent remains unchanged independent of step d).

5. The process for manufacturing an injection agent according to claim 4, wherein the concentration of sodium chloride in the injection agent is 0.9 wt % and the concentration of the coloring agent in the injection agent is 0.02 wt %.

6. The process for manufacturing an injection agent according to claim 5, wherein step a) of producing the first injection agent further comprises:

i) measuring the first amount of the first poloxamer such that based on the predetermined amount of the injection agent, the concentration of the first poloxamer in the injection agent is between 14 wt % and 17 wt %;

ii) measuring the second amount of the second poloxamer such that based on the predetermined amount of the injection agent the concentration of the second poloxamer in the injection agent is between 0.5 wt % and 1 wt %;

iii) measuring the amount of sodium chloride such that based on the predetermined amount of the injection agent the concentration of sodium chloride in the injection agent is 0.9 wt %;

iv) measuring the amount of the coloring agent such that based on the predetermined amount of the injection agent the concentration of the coloring agent in the injection agent is 0.02 wt %;

v) measuring an amount of water by subtracting a sum of the first amount of the first poloxamer, the second amount of the second poloxamer, the amount of sodium chloride and the amount of the coloring agent from the predetermined amount of the injection agent; and vi) mixing the amount of water, the first amount of the first poloxamer, the second amount of the second poloxamer, the amount of sodium chloride, and the amount of the coloring agent from steps ii) to v) with each other.

7. The process for manufacturing an injection agent according to claim 5, wherein the coloring agent includes methylene blue, toluidine blue or indigo carmine.

8. The process for manufacturing an injection agent according to claim 1, wherein the first poloxamer is poloxamer P407 and that the second poloxamer is poloxamer P188.

9. The process for manufacturing an injection agent according to claim 1, wherein:

in step c) it is verified that the present viscosity-over-temperature-curve lays between a minimum viscosity-over-temperature-curve and a maximum viscosity-over-temperature-curve if both have been determined at the predetermined shear rate used in step b);

in step d) the new injection agent is produced by changing at least the first amount of the first poloxamer, the second amount of the second poloxamer, or a combination thereof based on the first injection agent made in step a), if the present viscosity-over-temperature-curve does not lay between the minimum viscosity-over-temperature-curve and the maximum viscosity-over-temperature-curve; and in step e), steps b) and c) and, when necessary, step d) are repeated until it is determined in step c) that the maximum viscosity of the present viscosity-over-temperature-curve lays between the minimum viscosity-over-temperature-curve and the maximum viscosity-over-temperature-curve.

10. The process for manufacturing an injection agent according to claim 9, wherein:

in step d), (i) the first amount of the first poloxamer is increased when it is determined that the maximum viscosity of the present viscosity-over-temperature-curve is below the maximum viscosity of the minimum viscosity-over-temperature-curve or the first amount of the first poloxamer is reduced when it is determined that the maximum viscosity of the present viscosity-over-temperature-curve is above the maximum viscosity of the maximum viscosity-over-temperature-curve; (ii) the second amount of the second poloxamer is increased when it is determined that the temperature range at which the maximum viscosity of the present viscosity-over-temperature-curve is determined, is below the temperature range at which the maximum viscosity of the minimum-viscosity-over-temperature-curve is determined, or the second amount of the second poloxamer is reduced when it is determined that the temperature range at which the maximum viscosity of the present viscosity-over-temperature-curve is determined, is above the temperature range at which the maximum viscosity of the minimum-viscosity-over-temperature-curve is determined, or a combination of (i) and (ii).

11. The process for manufacturing an injection agent according to claim 9, wherein the minimum viscosity-over-temperature-curve and the maximum viscosity-over-temperature-curve are determined from the following table, in which each of the values for temperature, minimum viscosity (V_min), and maximum viscosity (V_max) have been determined at a shear rate of 95 s$^{-1}$:

| Temperature [° C.] | Minimum viscosity V_min [Pa s] | Maximum viscosity V_max [Pa s] |
|---|---|---|
| 20 | 0 | 1 |
| 23 | 0 | 1 |
| 27 | 0 | 1.9 |
| 30 | 0.54 | 1.9 |
| 33 | 1.08 | 1.9 |
| 36 | 1.62 | 1.9 |
| 37 | 1.8 | 1.9 |
| 38 | 1.62 | 1.9 |
| 40 | 1.26 | 1.9 |
| 45 | 0.36 | 1.9 |

12. The process for manufacturing an injection agent according to claim 9, wherein in step c) it is verified that the present viscosity-over-temperature-curve lays in the predetermined specific temperature range and between the minimum viscosity-over-temperature-curve and the maximum viscosity-over-temperature-curve both of which have been determined at the predetermined shear rate used in step b).

13. The process for manufacturing an injection agent according to claim 9, wherein in step d) the new injection agent is produced by changing at least the first amount of the first poloxamer, the second amount of the second poloxamer, or a combination thereof based on the first injection agent of step a), when it is determined that the present viscosity-over-temperature-curve within the predetermined specific temperature range does not lay between the minimum viscosity-over-temperature-curve and the maximum viscosity-over-temperature-curve.

14. The process for manufacturing an injection agent according to claim 1, wherein the predetermined specific temperature range lays between 37.0° C. and 37.5° C.

15. The process for manufacturing an injection agent according to claim 1, wherein the predetermined shear rate is 95.87 s$^{-1}$.

16. The process for manufacturing an injection agent according to claim 1, wherein the water is distilled water.

17. The process for manufacturing an injection agent according to claim 1, wherein the water has a concentration of 81 wt % to 85 wt % in the injection agent.

18. An injection agent comprising: a viscoelastic liquid including water, a first poloxamer, and a second poloxamer, wherein a maximum viscosity of the injection agent is in a predetermined specific temperature range comprising a range between a lower temperature (T1) of 36° C. and by an upper temperature (T2) of 38° C. and in a predetermined maximum viscosity range comprising a range between a lower maximum viscosity (V1) of 1.8 Pascal-second and by an upper maximum viscosity (V2) of 1.9 Pascal-second at a predetermined shear rate of 95 reciprocal seconds (s−1).

19. The injection agent of claim 18, wherein a concentration of the first poloxamer of the injection agent is in an amount between 14 wt % and 17 wt %, and the concentration of the second poloxamer of the injection agent is in an amount between 0.5 wt % and 1 wt %.

* * * * *